United States Patent
Henningson

(10) Patent No.: US 6,773,017 B2
(45) Date of Patent: Aug. 10, 2004

(54) SINGLE-PIECE SEAL ASSEMBLY

(75) Inventor: Carl J. Henningson, Canonsburg, PA (US)

(73) Assignee: Pittsburgh Cryogenic Services, Inc., Imperial, PA (US)

( * ) Notice: Subject to any disclaimer, the term of this patent is extended or adjusted under 35 U.S.C. 154(b) by 0 days.

(21) Appl. No.: 10/197,158

(22) Filed: Jul. 16, 2002

(65) Prior Publication Data
US 2004/0032090 A1 Feb. 19, 2004

(51) Int. Cl.[7] .............................. F16J 15/38
(52) U.S. Cl. ................. 277/391; 277/370; 277/374; 277/377; 277/399
(58) Field of Search ................. 277/358, 370, 277/371, 374, 375, 377, 391, 399

(56) References Cited

U.S. PATENT DOCUMENTS

| | | |
|---|---|---|
| 2,995,390 A | 8/1961 | Gardner |
| 3,122,375 A | 2/1964 | Greenwald |
| 3,948,533 A | 4/1976 | Novosad |
| 4,070,207 A | 1/1978 | Holdeman |
| 4,123,069 A | 10/1978 | Sato |
| 4,625,977 A * | 12/1986 | Azibert et al. ............... 277/361 |
| 4,813,342 A | 3/1989 | Schneider et al. |
| 4,973,065 A * | 11/1990 | Habich ....................... 277/399 |
| 5,628,517 A | 5/1997 | Jia |
| 5,944,489 A | 8/1999 | Vaughn et al. |
| 6,322,079 B1 * | 11/2001 | Mullaney, III ............... 277/371 |

FOREIGN PATENT DOCUMENTS

| | | |
|---|---|---|
| DE | 3428744 A | 2/1985 |
| DE | 29704914 U | 8/1997 |
| SU | 949268 | 8/1982 |
| WO | WO 96/31716 | 10/1996 |

* cited by examiner

Primary Examiner—Anthony Knight
Assistant Examiner—E Peavey
(74) Attorney, Agent, or Firm—Cohen & Grigsby, P.C.

(57) ABSTRACT

The invention is a single-piece seal assembly comprising an annular seal body. A retainer is positioned at a first end of the seal body. A rotable seal is concentric with the retainer and has a notch positioned on an inner diameter of a first face of said rotable seal. In the notch is positioned a single shim. The shim is of a length such that it is capable of providing a selected seal compression. An annular bellows having first and second ends is affixed to an inner diameter of the seal body. On the first end of the bellows is a ring holder. The ring holder holds a ring seal.

28 Claims, 3 Drawing Sheets

SINGLE-PIECE SEAL ASSEMBLY

BACKGROUND OF INVENTION

1. Field of the Invention

This invention relates generally to cryogenic pump applications. More specifically, the invention relates to a seal assembly for cryogenic pump applications.

2. Description of the Background Art

In cryogenic applications, cryogenic materials are pumped from a source to the point of application. The nature of the materials used in cryogenic applications require specialized instrumentality. For example, the pumps that move the cryogenic product from its source to the point of application are highly specialized as are the seal assemblies involved in the delivery pathway. A seal assembly for cryogenic applications must keep atmospheric contaminants out of the cryogenic material, while keeping the cryogenic materials inside the source to application pathway. To meet the specialized needs of cryogenic sealing, standard bearing shaft seals must compensate for the extraordinary contraction of materials immersed in the cryogenic environment. Presently, current practice dictates a multi-piece sealing assembly consisting of a bellows, a loose shim stack determined empirically for each assembly, a rotating shaft seal ring, and a seal body.

A critical factor in the current practice for installing a seal assembly is providing a seal assembly with a seal compression within the range specified by cryogenic equipment manufacturers. A skilled artisan readily recognizes that manufacturers of cryogenic equipment to which seal assemblies are attached specify seal compression ranges. A seal assembly with a seal compression outside of the range will not operate properly. When installing a seal on a cryogenic pump, seal compression is determined by 1) measuring the and recording the distance from the end of the shaft to the rotating seal without compressing the bellows (free length state); 2) depressing the bellows/rotating seal combo and measuring the distance from the end of the shaft to the rotating seal (compressed state); 3) Calculating the difference between the free length state and the compressed state. If the seal compression is higher than the manufacturer's recommended range, shims must be added to increase the compressed state measurement, which results in a lower seal compression. The following equation is illustrative:

Free Length State−(Compressed State+$X$)=Seal Compression

In the above equation, the distance obtained by adding shims is represented as X.

Further illustrative of the current practice is the following example of the steps to install a seal assembly in a cryogenic pump application. The steps are as follows:

1. A dial indicator or caliper having the capability of measuring within 0.010 to 0.050 inch is mounted in position against the rotating seal on the shaft as shown in FIG. 1.
2. The dial indicator is set to read zero.
3. The impeller screw is then slowly loosened until the dial indicator reading stops increasing. This reading is the seal compression.
4. The reading is then confirmed several times by repeating steps 2 and 3, above.
5. If the reading is greater than the seal manufacturer's specification, the impeller screw, dummy impeller, and rotating seal face are removed from the shaft and a second aluminum shim is inserted.
6. The procedure is again repeated to determine the new total seal compression.
7. If necessary, an additional seal is inserted. Generally, a maximum of six shims may be installed. If proper seal compression cannot be obtained with six shims, the shaft seal and O ring behind the flange are removed and another complete assembly must be installed on the shaft. The measurement procedure must then be repeated with the new assembly components in place. If correct seal compression still cannot be obtained, a shaft extension may be required.

This standard practice for installing the multi-part seal presents the following disadvantages:

1. Dimensional variations occur resulting in a varying amount of shims necessary to achieve proper seal compression;
2. As a consequence of the dimensional variations, no means of retaining the components within the seal body has been developed. Therefore, up until now and under the current practice, a single-piece universal seal was not possible;
3. The current sealing practice makes the assembly of the shaft seal time-consuming due to the labor-intensive nature of taking careful height measurements and selection of the suitable shim stack;
4. The labor intensive nature of the current practice increase the probability that the seal components will become contaminated from handling; and
5. There is an increased risk of human error.

It is therefore an object of the present invention to provide a single-piece universal seal to be used in cryogenic sealing. The present invention achieves this by controlling dimensional variation, for example by controlling bellows height which in turn provides for a single shim stack height thereby eliminating the high amount of variation which exists in current practice. It is another object of the present invention to reduce the current high amount of time and labor spent on shaft seal assembly by providing a single-piece seal assembly. It is still another object of the present innovation to reduce the likelihood of shaft assembly contamination, which is also achieved by providing a single-piece universal seal assembly.

SUMMARY OF INVENTION

The invention is a single-piece seal assembly used to prevent escape of cryogenic materials in cryogenic pump applications. The single-piece seal assembly also is effective in keeping atmospheric contaminants out. The single-piece seal assembly reduces the installation time and reduces the chances of contamination and human error.

The single-piece seal assembly comprises an annular seal body. A retainer is positioned at a first end of the seal body. A rotable seal is concentric with the retainer and has a notch positioned on an inner diameter of a first face of said rotable seal. In the notch is positioned a single shim. The shim is of a length such that it is capable of providing a selected seal compression. An annular bellows having first and second ends is affixed to an inner diameter of the seal body. On the first end of the bellows is a ring holder. The ring holder holds a ring seal.

To manufacture the single-piece seal assembly (hereinafter referred to as "seal-assembly"), discrete sealing components are inserted into a seal body followed by a retainer which is fit onto the seal body to secure the components together, thereby forming the completed seal assembly. The bellows having a preset height provides the dimensional stability needed for the single-piece design. This bellows produces a stable and consistently accurate seal height, eliminating the need for a dial indicator measurement to determine the shim dimension for each installation, which as mentioned above, is currently the practice. The seal assembly includes a single shim stack equivalent ("shim"), which is adapted to provide a compressed state that will obtain a seal compression within the manufacturer's specified range. The shim is fitted into a machined notch in the rotating seal. The retainer secures all seal components within the seal body to create the single-piece seal assembly.

DETAILED DESCRIPTION OF INVENTION

Preferred materials for each component are listed, however, materials with similar qualities and characterizations which will not change the efficacy of the invention may be used. The invention is a single-piece cryogenic seal assembly, which includes all the required sealing components of multi-part seals, i.e., bellows, rotatable seal, ring seal, ring seal holder, and a shim stack equivalent. The present invention uses a bellows, preferably welded stainless steel, having a pre-set height. Unlike the prior art, the claimed invention comprises a retainer that, in addition to securing the rotatable seal, enables all the seal components to be contained within the seal body. The dimensional accuracy and stability of the bellows employed in the invention ensures the consistent height of the shim.

Unlike multi-part seals which require careful height measurements and shimming, the single-piece seal assembly may be installed without taking any measurements. Assembly time is reduced, and higher consistency is achieved. The seal assembly may be used in all standard cryogenic pumps that employ a bellows-type seal. Available in both flanged and threaded style seal bodies, the seal assembly is a direct replacement for standard multi-part seals on common pumps.

Figure 1:
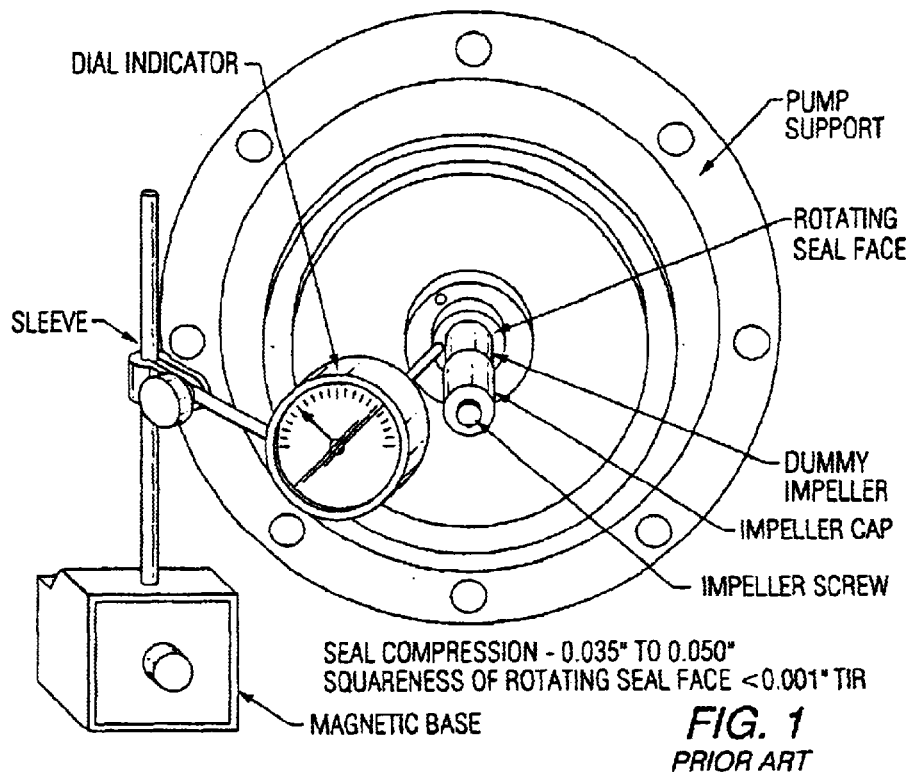
FIG. 1 shows procedure for measuring the shim dimension for a conventional multi-part seal assembly.
Figure 2:
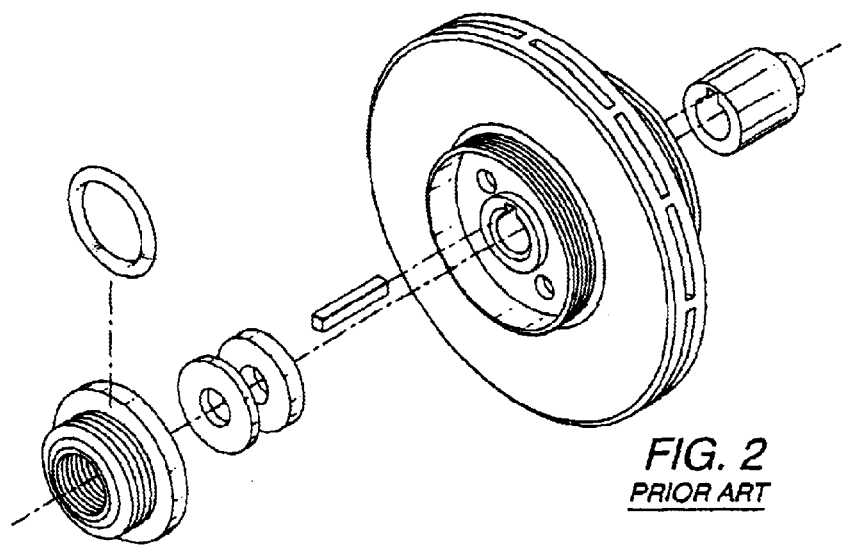
FIG. 2 shows the conventional multi-part seal, which is presently the cryogenic industry standard.
Figure 3:
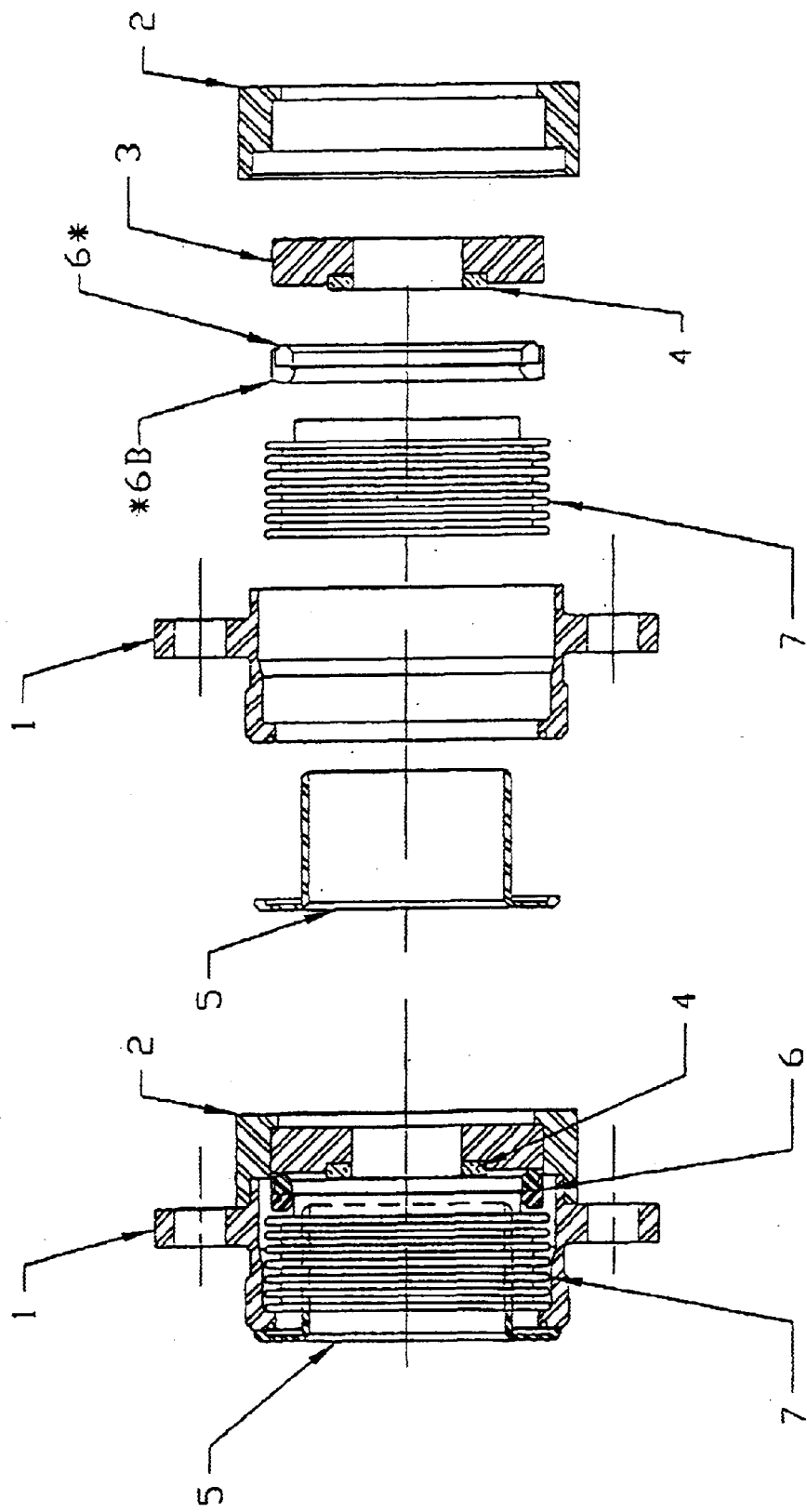
FIG. 3 shows an exploded view of an embodiment of the invention.
Figure 4:
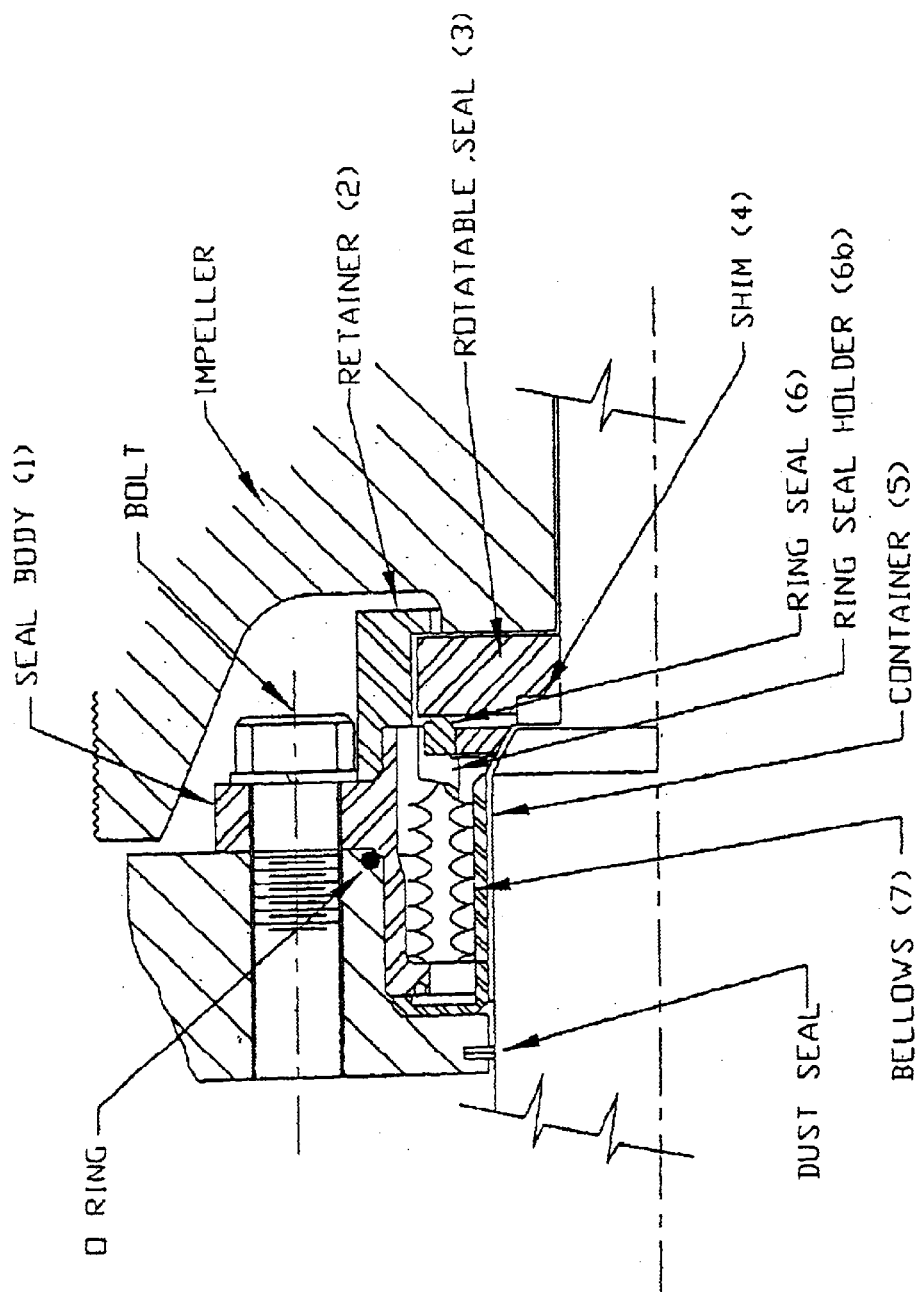
FIG. 4 shows a cutaway view of an embodiment of the invention.

FIG. 3 shows both an exploded view of the claimed invention and a view of the invention as assembled. Referring to FIG. 3, the invention comprises a seal body 1, preferably metallic, and more preferably bronze, a bellows 7, preferably welded stainless steel, having a pre-set height, ring seal 6, preferably made of a carbon material and holder 6B, preferably the holder is made from stainless steel a shim 4, preferably metallic, and more preferably copper shim rotable seal 3, preferably metallic, more preferably stainless steel (alternate embodiments may include a rotable seal made from tungsten carbide or ceramic), a retainer 2, preferably metallic, more preferably bronze or brass, and container 5, preferably metallic, more preferably of bronze or brass. Alternate embodiments may include components made of other materials including ceramics.

Not used in multi-part seal assemblies, the retainer is integral to the single-piece seal assembly design since it retains all seal components within the seal body. The seal body and retainer are machined from metal, preferably bronze. In the presently implemented embodiment, the rotable seal 3 is designed for preferably at least 0.003-inch clearance, to compensate for shaft bearing variations. The 0.003 inch clearance is between the outer diameter of the rotating seal and the inner diameter of the retainer. A clearance is necessary to avoid friction, which could potentially result in an unsafe condition and/or result in the equipment functioning improperly.

A notch is machined into the inner diameter of the rotable seal. The notch receives a shim 4. In the presently preferred implementation, the shim 4 is slightly thicker than four standard shims, which provides the additional distance, from about 0.015 to 0.070 inches, necessary to achieve an increased compressed state sufficient to enable the seal compression to be within the ranges presently identified by equipment manufacturers, i.e. 0.035 to 0.080 inches. It is important to note that the presently implemented 4 shim height results from the presently available seal compression ranges in the art. If those ranges change, the shim can be adapted to achieve a height (X) that allows for the seal compression to be within the newly specified range. In the preferred implementation, the shim 4 is shrunk-fit, or interferencely fit into the machined notch in the rotable seal 3. This interference fit is achieved by heating the rotatable seal 3 and cooling the shim 4, placing the cooled shim 4 into the machined notch, then allowing the combination to return to ambient temperature. Once assembled, the shim 4 has an available thickness of four standard shims. The additional shim thickness fits into the machined opening in the rotable seal 3, leaving just the available shim dimension projecting beyond the rotable seal face.

To make the single-piece seal assembly parts are inserted into the seal body in the following sequence: bellows, ring seal holder, ring seal and the rotable seal and shim combination. The retained must be attached to the seal body. This can be done by conventional means, however, the seal body and retainer are preferably manufactured to an interference fit, which requires shrink-fitting in the assembly process. A preferred way to achieve the interference fit involves chilling the seal body while the rotating ring retainer is warmed. The temperature differential between the two parts is sufficient to permit the retainer to be slip fit onto the seal body. Once assembled, the parts are permitted to return to ambient temperature. This results in a shrink fit of the retainer onto the seal body to capture the seal components and form the single-piece seal assembly. The final assembly step is to insert the container into the opposite end (the atmospheric side) of the seal body. Preferably, a close tolerance fit of the container is sufficient to retain the part during installation of the seal assembly onto the pump shaft.

As mentioned above, the single-piece seal assembly is available in both flanged and threaded type, such features present on the seal body. All the components are retained as one assembly. Because the seal assembly is dimensionally stable and provides for a shim height that will achieve a seal compression within the desired range, no measurements or shimming is necessary. All that is necessary is that the single-piece seal assembly be placed in position, i.e., onto the shaft, thus making the installation of a seal assembly in cryogenic applications quicker, cleaner, and less labor intensive. The seal is either screwed or bolted to the back plate of a pump; the impeller is placed on the shaft, the impeller retainer and bolt are installed on the shaft, the bolt is then torqued and can be safety wired according to pump manufacturer's specifications.

While presently preferred embodiments have been described and shown, the invention may be otherwise embodied within the scope of the appended claims.

What is claimed is:

1. A single-piece seal assembly, comprising:
   an annular seal body having first and second ends;
   a retainer attached to said first end of said seal body;
   a rotable seal having a first and a second face, said rotable seal concentric with said retainer and having a notch positioned on an inner diameter of said second face;
   a shim positioned in said notch, said shim adapted to provide a selected seal compression;
   an annular bellows having a pre-determined height, said bellows having first and second ends, said bellows bellows affixed to an inner diameter of the seal body;
   a ring seal holder affixed to said first end of the bellows, said ring holder having first and second ends; and
   a ring seal on said first end of said ring seal holder, wherein said retainer retains said bellows, said rotable seal having said notch with said shim positioned therein, said ring seal holder, and said ring seal in said seal body thereby providing a single-piece seal, and wherein said bellows and said shim are adapted cooperate to provide a selected seal compression.

2. The single-piece seal assembly as claimed in claim 1, further comprising a container fit into said second end of the seal body, wherein an outer diameter of said container is concentrically adjacent to an inner diameter of the metal bellows.

3. A single-piece seal assembly as claimed in claim 1, wherein said seal body is made from a material selected from the group consisting of stainless steel, brass, ceramic, and bronze.

4. A single-piece seal assembly as claimed in claim 1, wherein said retainer is made from a material selected from the group consisting of brass, bronze, aluminum, and ceramic.

5. A single-piece seal assembly as claimed in claim 1, wherein said rotable seal is made from a material selected from the group consisting of stainless steel, tungsten, and ceramic.

6. A single-piece seal assembly as claimed in claim 1, wherein said shim is made of material selected from the group consisting of copper, brass, bronze, aluminum, and stainless steel.

7. A single-piece seal assembly as claimed in claim 1, wherein said bellows is stainless steel.

8. A single-piece seal assembly as claimed in claim 1, wherein said container is made from material selected from the group consisting of brass, bronze, tungsten carbide, and stainless steel.

9. A single-piece seal assembly as claimed in claim 1, wherein said seal body is flanged.

10. A single-piece seal assembly as claimed in claim 1, wherein said seal body is threaded.

11. A single-piece seal assembly as claimed in claim 1, wherein said ring seal holder is stainless steel.

12. A single-piece seal assembly as claimed in claim 1, wherein said ring seal is a carbon material.

13. A single-piece seal assembly as claimed in claim 1, wherein a clearance between the rotating seal and the retainer is at least 0.003 inches.

14. A single-piece seal assembly as claimed in claim 1, wherein said shim provides an available shim height of about 0.12 inches to about 0.072 inches.

15. A single-piece seal assembly, comprising:
   a rotable seal having a first face and a second face, said rotable seal having a notch positioned on an inner diameter of said second face;
   a seal body having a first end, a second end, an inner diameter, and an outer diameter;
   an annular bellows having a pre-determined height, said bellows affixed to said inner diameter of said seal body;
   a shim positioned in said notch of said rotable seal and adapted to provide a selected seal compression in cooperation with said bellows;
   a ring seal holder affixed to said first end of the bellows, said ring seal holder having first and second ends;
   a ring seal on said first end of said ring seal holder; and
   a retainer attached to said first end of said seal body and retaining said bellows, said rotable seal having said notch with said shim positioned therein, said ring seal holder, and said ring seal in said seal body.

16. The single-piece seal assembly as claimed in claim 15, further comprising a container fit into said second end of the seal body, wherein an outer diameter of said container is concentrically adjacent to an inner diameter of the metal bellows.

17. A single-piece seal assembly as claimed in claim 15, wherein said seal body is made from a material selected from the group consisting of stainless steel, brass, ceramic, and bronze.

18. A single-piece seal assembly as claimed in claim 15, wherein said retainer is made from a material selected from the group consisting of brass, bronze, aluminum, and ceramic.

19. A single-piece seal assembly as claimed in claim 15, wherein said rotable seal is made from a material selected from the group consisting of stainless steel, tungsten, and ceramic.

20. A single-piece seal assembly as claimed in claim 15, wherein said shim is made of material selected from the group consisting of copper, brass, bronze, aluminum, and stainless steel.

21. A single-piece seal assembly as claimed in claim 15, wherein said bellows is stainless steel.

22. A single-piece seal assembly as claimed in claim 15, wherein said container is made from material selected from the group consisting of brass, bronze, tungsten carbide, and stainless steel.

23. A single-piece seal assembly as claimed in claim 15, wherein said seal body is flanged.

24. A single-piece seal assembly as claimed in claim 15, wherein said seal body is threaded.

25. A single-piece seal assembly as claimed in claim 15, wherein said ring seal holder is stainless steel.

26. A single-piece seal assembly as claimed in claim 15, wherein said ring seal is a carbon material.

27. A single-piece seal assembly as claimed in claim 15, wherein a clearance between the rotating seal and the retainer is at least 0.003 inches.

28. A single-piece seal assembly as claimed in claim 15, wherein said shim provides an available shim height of about 0.12 inches to about 0.072 inches.

* * * * *